(12) United States Patent
Dornean (10) Patent No.: US 11,024,067 B2
(45) Date of Patent: Jun. 1, 2021

(54) METHODS FOR DYNAMIC MANAGEMENT OF FORMAT CONVERSION OF AN ELECTRONIC IMAGE AND DEVICES THEREOF

(71) Applicant: Mitchell International, Inc., San Diego, CA (US)

(72) Inventor: Marius Dornean, Brea, CA (US)

(73) Assignee: Mitchell International, Inc., San Diego, CA (US)

(*) Notice: Subject to any disclaimer, the term of this patent is extended or adjusted under 35 U.S.C. 154(b) by 54 days.

(21) Appl. No.: 16/569,886

(22) Filed: Sep. 13, 2019

(65) Prior Publication Data

US 2020/0105037 A1   Apr. 2, 2020

Related U.S. Application Data

(60) Provisional application No. 62/738,887, filed on Sep. 28, 2018.

(51) Int. Cl.
*G06N 3/08* (2006.01)
*G06T 5/00* (2006.01)
*G06T 7/11* (2017.01)
*G06T 11/60* (2006.01)

(52) U.S. Cl.
CPC ............ *G06T 11/60* (2013.01); *G06N 3/08* (2013.01); *G06T 5/002* (2013.01); *G06T 7/11* (2017.01); *G06T 2207/20081* (2013.01); *G06T 2207/20221* (2013.01)

(58) Field of Classification Search
None
See application file for complete search history.

(56) References Cited

U.S. PATENT DOCUMENTS

| 6,134,338 | A | * | 10/2000 | Solberg | G06K 9/00476 382/113 |
| 2004/0267734 | A1 | * | 12/2004 | Toshima | G06K 9/00442 |
| 2009/0037384 | A1 | * | 2/2009 | Ono | G06F 16/5854 |
| 2009/0037463 | A1 | * | 2/2009 | Terao | G06F 16/907 |
| 2014/0181969 | A1 | * | 6/2014 | Mousty | H04L 63/02 726/23 |
| 2016/0086142 | A1 | * | 3/2016 | Ando | G06Q 30/0639 705/26.9 |

(Continued)

*Primary Examiner* — David H Chu
(74) *Attorney, Agent, or Firm* — Sheppard Mullin Richter & Hampton LLP (57) ABSTRACT

A method, non-transitory computer readable medium, and computing apparatus that identifies with automated image analysis two or more different types of content in image data for an electronic image associated with one or more of a plurality of types of claims. The image data associated with each of the identified two or more different types of content is converted by a different one of a plurality of automated content conversion techniques based on the association with the one or more types of claims and on the identified one of the plurality of types of content. Modified image data for the electronic image is generated based on the converted image data associated with each of the identified two or more different types of content. The modified image data for the electronic image with the converted image data for each of the identified two or more different types of content is provided.

18 Claims, 6 Drawing Sheets

(56) References Cited

U.S. PATENT DOCUMENTS

| | | | |
|---|---|---|---|
| 2016/0173614 A1* | 6/2016 | Alexandrescu | H04L 29/08072 |
| | | | 709/228 |
| 2017/0006320 A1* | 1/2017 | Beattie, Jr. | H04N 21/2187 |
| 2017/0111532 A1* | 4/2017 | Amtrup | G06Q 40/08 |
| 2019/0074093 A1* | 3/2019 | Walsh | G16H 10/20 |
| 2019/0371474 A1* | 12/2019 | Borsic | G16H 20/40 |
| 2020/0074169 A1* | 3/2020 | Mukhopadhyay | G06F 40/174 |
| 2020/0134820 A1* | 4/2020 | Hendriks | G06T 7/0012 |
| 2020/0265569 A1* | 8/2020 | Lee | G06K 9/6267 |

* cited by examiner

PHOTO CONTENT

TEXT CONTENT

Lorem ipsum dolor sit amet, consetetur sadipscing elitr, sed diam nonumy eirmod tempor invidunt ut labore et dolore magna aliquyam erat, sed diem voluptus. At vero eos et accusam et justo duo dolores et ea rebum. Stet clita kasd gubergren, no sea takimata sanctus est Lorem ipsum solor sit amet.

*FIG. 5A*

PHOTO CONTENT

TEXT CONTENT

Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum. Stet clita kasd gubergren, no sea takimata sanctus est Lorem ipsum dolor sit amet.

FIG. 5B

METHODS FOR DYNAMIC MANAGEMENT OF FORMAT CONVERSION OF AN ELECTRONIC IMAGE AND DEVICES THEREOF

This application claims the benefit of U.S. Provisional Patent Application Ser. No. 62/738,887, filed Sep. 28, 2018, which is hereby incorporated by reference in its entirety.

FIELD

This technology relates to methods, non-transitory computer readable media and devices for dynamic management of format conversion of an electronic image.

BACKGROUND

When converting formats of images which have pixels that are represented by a color gamut (such as 8 bit, 24 bit, or 32 bit by way of example) to a bitonal format, prior conversion processes have leveraged one of a plurality of conversion algorithms to reproduce the original image using the best possible fidelity. These prior conversion algorithms may use characteristics, such as pixel density or contrast, to reproduce the details of the original image in a bitonal format.

Unfortunately, these prior conversion algorithms are only optimized for one vector. As a result, during this conversion of the image an undesirable amount of fidelity is often lost and not recoverable. Accordingly, during for example electronic processing of a claim, when the image is later retrieved for use the lost fidelity may result in inaccuracies with processing of the claim.

SUMMARY

A method that identifies, by a computing apparatus, with automated image analysis two or more different types of content in image data for an electronic image associated with one or more of a plurality of types of claims. The image data associated with each of the identified two or more different types of content is converted, by the computing apparatus, by a different one of a plurality of automated content conversion techniques based on the association with the one or more types of claims and on the identified one of the plurality of types of content. Modified image data for the electronic image is generated, by the computing apparatus, based on the converted image data associated with each of the identified two or more different types of content. The modified image data for the electronic image with the converted image data for each of the identified two or more different types of content is provided by the computing apparatus.

A non-transitory computer readable medium having stored thereon instructions comprising executable code which when executed by a processor, causes the processor to identify with automated image analysis two or more different types of content in image data for an electronic image associated with one or more of a plurality of types of claims. The image data associated with each of the identified two or more different types of content is converted by a different one of a plurality of automated content conversion techniques based on the association with the one or more types of claims and on the identified one of the plurality of types of content. Modified image data for the electronic image is generated based on the converted image data associated with each of the identified two or more different types of content. The modified image data for the electronic image with the converted image data for each of the identified two or more different types of content is provided.

A computing apparatus comprising a memory coupled to a processor which is configured to execute programmed instructions stored in the memory to identify with automated image analysis two or more different types of content in image data for an electronic image associated with one or more of a plurality of types of claims. The image data associated with each of the identified two or more different types of content is converted by a different one of a plurality of automated content conversion techniques based on the association with the one or more types of claims and on the identified one of the plurality of types of content. Modified image data for the electronic image is generated based on the converted image data associated with each of the identified two or more different types of content. The modified image data for the electronic image with the converted image data for each of the identified two or more different types of content is provided.

This technology provides a number of advantages including providing methods, non-transitory computer readable medium, and apparatuses that optimize management of dynamic format conversion of an electronic image. This technology uses content aware algorithms to ensure that different parts of an image, such as a non-bitonal image, are converted using different methods (such as contrast vs edge enhancement vs pixel density by way of example only) to achieve a conversion that retains as much fidelity as possible for non-textual parts of the document, while enhancing textual legibility. With this technology, converted images will contain compressed images that have enhanced photo and text elements when compared to previously available converters to facilitate use of the images in other applications, such as electronic claims processing.

DETAILED DESCRIPTION

Figure 1:
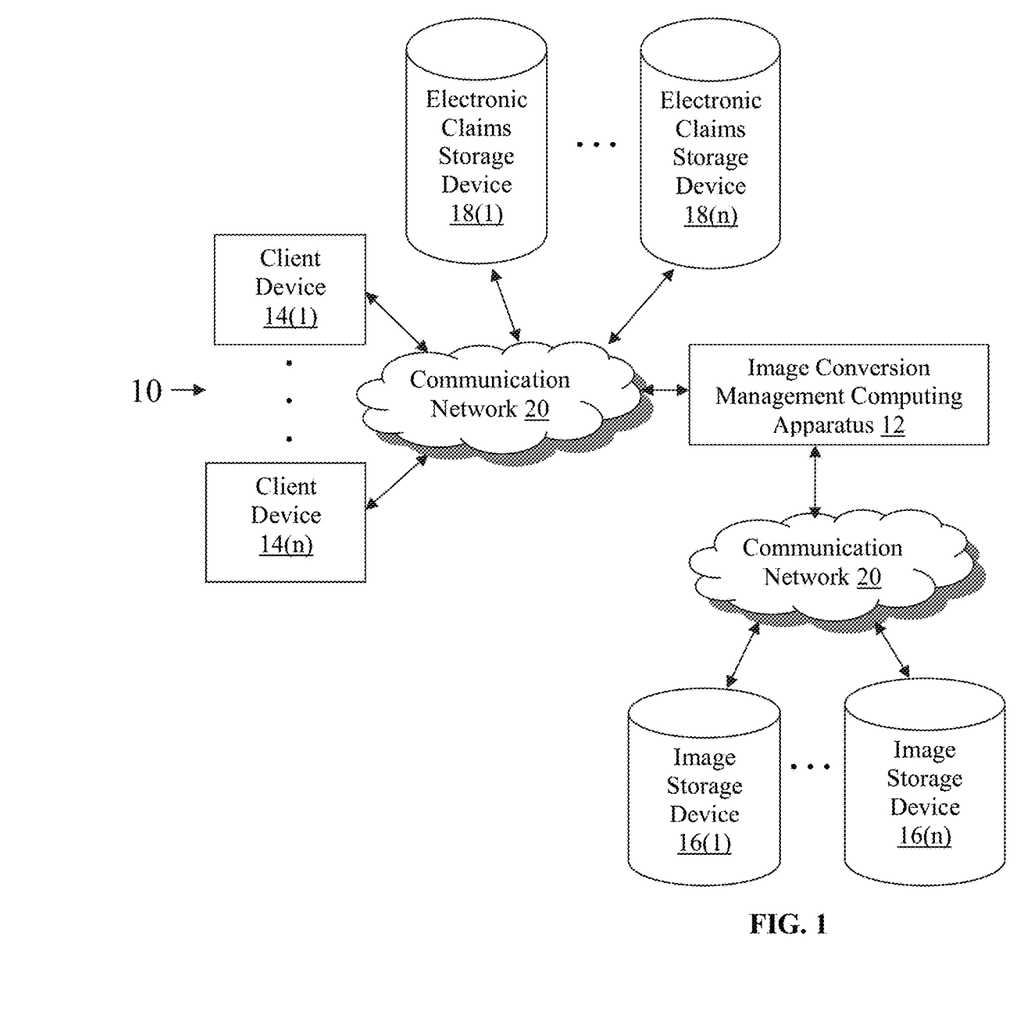
FIG. 1 is a block diagram of an environment with an example of an image conversion management computing apparatus that optimizes management of dynamic format conversion of an electronic image.
Figure 2:
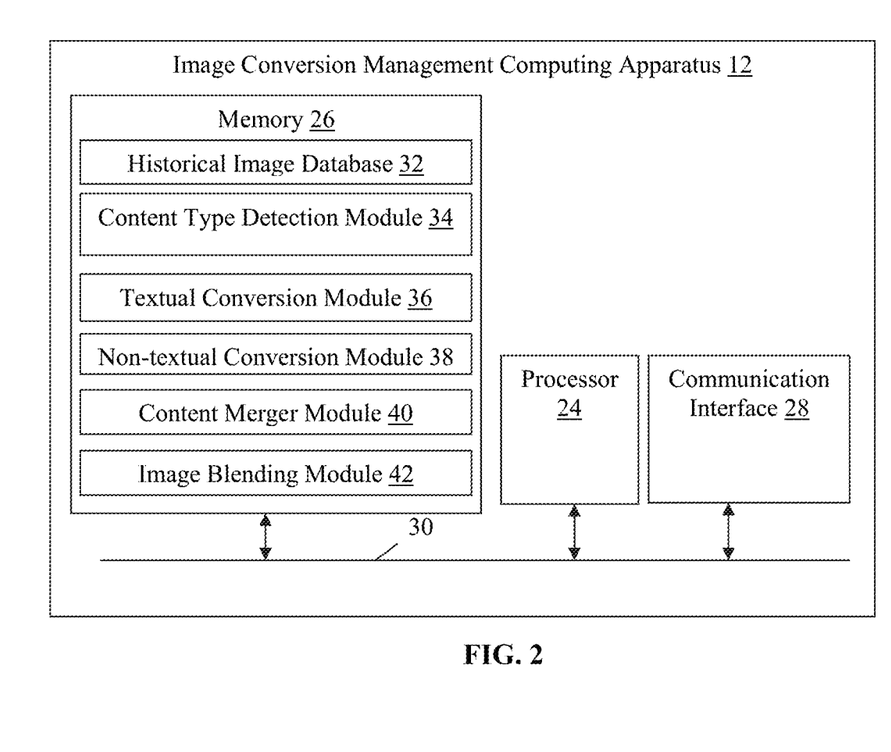
FIG. 2 is a block diagram of the example of the image conversion management computing apparatus shown in FIG. 1.

An environment 10 with an example of an image conversion management computing apparatus 12 that that optimizes management of dynamic format conversion of an electronic image, which is a non-bitonal image in this example, is illustrated in FIGS. 1-2. In this particular example, the environment 10 includes the image conversion management computing apparatus 12, client devices 14(1)-14(n), image storage devices 16(1)-16(n), and electronic claims storage devices 18(1)-18(n) coupled via one or more communication networks 20, although the environment could include other types and numbers of systems, devices, components, and/or other elements as is generally known in the art and will not be illustrated or described herein. This technology provides a number of advantages including providing methods, non-transitory computer readable medium, and apparatuses that optimize management of dynamic format conversion of an electronic image.

Referring more specifically to FIGS. 1-2, the image conversion management computing apparatus 12 is programmed to optimize management of dynamic format conversion of an electronic image, such as an insurance claim document with textual content and non-textual content, as illustrated and described herein, although the apparatus can perform other types and/or numbers of functions or other operations and this technology can be utilized with other types of claims. In this particular example, the image conversion management computing apparatus 12 includes a processor 24, a memory 26, and a communication interface 28 which are coupled together by a bus 30, although the image conversion management computing apparatus 12 may include other types and/or numbers of physical and/or virtual systems, devices, components, and/or other elements in other configurations.

The processor 24 in the image conversion management computing apparatus 12 may execute one or more programmed instructions stored in the memory 26 for optimizing management of dynamic format conversion of an electronic image as illustrated and described in the examples herein, although other types and numbers of functions and/or other operation can be performed. The processor 24 in the image conversion management computing apparatus 12 may include one or more central processing units and/or general purpose processors with one or more processing cores, for example.

The memory 26 in the image conversion management computing apparatus 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. In this particular example, the memory 26 includes a historical image database 32, a content type detection module 34, a non-textual conversion module 36, a textual conversion module 38, a content type merger module 40, and an image blending module 42, although the memory 26 can comprise other types and/or numbers of other modules, programmed instructions and/or data and these stored instructions, data, and/or modules may be on and executed by other systems, devices, components, and/or other elements.

The historical image database 32 may store unconverted non-bitonal images and corresponding dynamically converted bitonal images for use in training machine learning, such as a deep neural network (DNN) for different aspects of examples of the claimed technology, although other images and/or data may be stored and used for other types of operations.

The content type detection module 34 may comprise stored programmed instructions for identifying different types of content in an image and outer boundaries of each of the regions with a different type of content, such as identifying pixels of an outer boundary of each type of content in the image data of the electronic image. Additionally, the content type detection module 34 may comprise stored programmed instructions for separating each portion of the image data for the electronic image associated with one of the identified types of content into separate parallel image data for a parallel electronic image, although other manners for processing the different identified regions of the image may be used.

Further, the content type detection module 34 may comprise stored programmed instructions for machine learning, such as for a deep neural network (DNN) that may be executed by the image conversion management computing apparatus 12 and trained to generate data, models and/or one or more executable rules to assist in identifying regions in an image with different types of content and outer boundaries of those identified regions, although other aspects may be identified. In particular, the DNN may have a structure and synaptic weights trained using semi-supervised machine learning techniques on for example unconverted non-bitonal images and corresponding dynamically converted bitonal images to learn how to identify different regions in the image data for the electronic image with different types of content and how to identify the outer boundaries of those identified regions, such as the particular pixels which define the outer boundaries by way of example only. Further, in this particular example this deep neural network (DNN) executed by the image conversion management computing apparatus 12 provides significantly more effective and cost efficient identification of each of the regions in the image data for the electronic image with different types of content as well as the outer boundaries of each of those regions to facilitate the dynamic conversion, although other matters for identifying content type as well as the boundaries may be used.

The non-textual conversion module 36 may comprise stored programmed instructions for converting one or more regions in the image data for the electronic image with non-textual content, such as an image or a diagram by way of example, to compress the image data for those one or more regions, although other manners for converting or otherwise compressing the image data in those one or more identified regions may be used. Additionally, the non-textual conversion module 36 may further comprise different sets of stored programmed instructions for converting different types of identified non-textual content, such as one set of programmed instructions for converting image data for the electronic image relating to a picture or other image or and another set of programmed instructions for converting image data for the electronic image relating to a diagram by way of example.

The textual conversion module 38 may comprise stored programmed instructions for converting one or more regions in image data for the electronic image with textual content to compress the image data for those one or more regions, although other manners for converting or otherwise compressing the one or more identified regions may be used. Additionally, the textual conversion module 36 may comprise different sets of stored programmed instructions for converting different types of textual content, such as one set of programmed instructions for converting image data for the electronic image relating to one type and/or size of font and another set of programmed instructions for converting image data for the electronic image relating to another type and/or size of font by way of example.

The content type merger module 40 may comprise stored programmed instructions for merging or otherwise reassembling separated portions of the image data for the electronic image in parallel images, although other techniques for merging or otherwise reassembling separated regions or other portions of the image data for the electronic image may be used.

The image blending module 42 may comprise stored programmed instructions for blending the identified regions of image data for the electronic image with the different types of content after the dynamic target conversion, such as programmed instructions for a softening technique or a blurring technique applied at the outer boundary between identified regions of the identified different types of content by way of example, although other types of image adjustment operations may be used.

The communication interface 28 in the image conversion management computing apparatus 12 operatively couples and communicates between one or more of the client devices 14(1)-14(n), the image storage devices 16(1)-16(n), which are all coupled together by one or more of the communication networks 20, although other types and numbers of communication networks or systems with other types and numbers of connections and configurations to other devices and elements. By way of example only, the communication networks 20 can use TCP/IP over Ethernet and industry-standard protocols, including NFS, CIFS, SOAP, XML, LDAP, SCSI, and SNMP, although other types and numbers of communication networks, can be used. The communication networks 20 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

Each of the client devices 14(1)-14(n), the image storage devices 16(1)-16(n), and the electronic claims storage devices 18(1)-18(n) may include a processor, a memory, and a communication interface, which are coupled together by a bus or other link, although other type and/or numbers of other devices and/or nodes as well as other network elements could be used.

In this particular example, each of the client devices 14(1)-14(n) may input and provide electronic images, such as electronic images associated with one of a plurality of different types of insurance claims with, for example, textual content and non-textual content to be evaluated and processed for dynamic conversion by the image conversion management computing apparatus 12, although the electronic images can be obtained from other sources. Additionally, each of the client devices 14(1)-14(n) may request, receive and process or otherwise interact with one or more electronic claims obtained from the electronic claims storage devices 18(1)-18(n) and image data for one or more electronic images associated with the one or more electronic claims from the image storage devices 16(1)-16(n).

The image storage devices 16(1)-16(n) may store the unconverted non-bitonal images and the converted bitonal images, although other types and/or numbers of electronic images and/or data may be stored and other types and/or numbers of systems, devices, components, and/or other elements could be used for storage. In this particular example, the image storage devices 16(1)-16(n) may comprise various combinations and/or types of storage hardware and/or software and may represent a system with multiple network server devices in a data storage pool, which may include internal or external networks.

The electronic claims storage devices 18(1)-18(n) may store one or more types of electronic claims associated with one or more of the stored electronic images, although other images and/or data may be stored and other types and/or numbers of systems, devices, components, and/or other elements could be used for storage. In this particular example, the electronic claims storage devices 18(1)-18(n) may comprise various combinations and/or types of storage hardware and/or software and may represent a system with multiple network server devices in a data storage pool, which may include internal or external networks.

Although the exemplary network environment 10 with the image conversion management computing apparatus 12, the client devices 14(1)-14(n), the storage devices 16(1)-16(n), the electronic claims storage devices 18(1)-18(n) and the communication networks 20 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 5A:
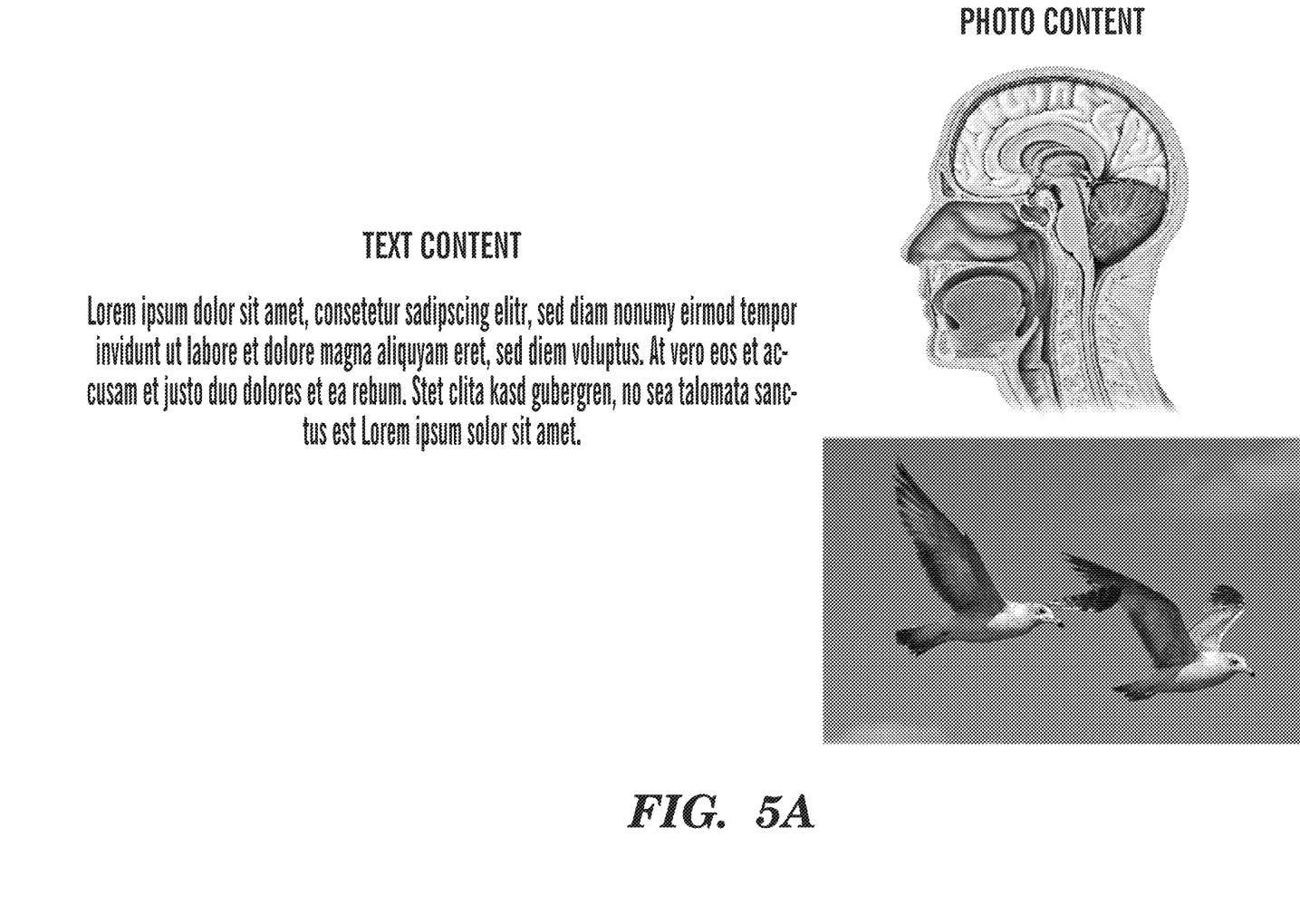
FIG. 5A is a diagram of an example of an unconverted non-bitonal image containing both text and photo materials.

An example of a method for managing dynamic format conversion of an electronic non-bitonal image will now be illustrated and described with reference to FIGS. 1-3 and 5A-5B. In step 300, the image conversion management computing apparatus 12 ingests or otherwise obtains image data for an electronic non-bitonal image for dynamic conversion in multiple vectors, such as illustrated in FIG. 5A by way of example only, although other types and/or numbers of electronic images may be obtained for this dynamic conversion. Additionally, in this particular example the obtained image data for the electronic image has an association with one or more of a plurality of types of claims. This association may be provided with the image data for the electronic image or may be provided based on where the image data for the electronic image is obtained from, such as from one of the image storage devices 16(1)-16(n) which is designated as storing image data for electronic images associated with one or more of a plurality of types of claims, although other manners for determining this association may be used. By way of example only, the image conversion management computing apparatus 12 could analyze at least a portion of the content in the image data for the electronic image to determine if the content is correlated to stored content associated with one or more of a plurality of types of claims. In these examples, the association of the image data for the electronic image with one or more of a plurality of types of claims influences the type of conversion technique which may be executed by the image conversion management computing apparatus 12 based on the identified type of content, although other factors may affect the type of conversion technique used.

Figure 3:
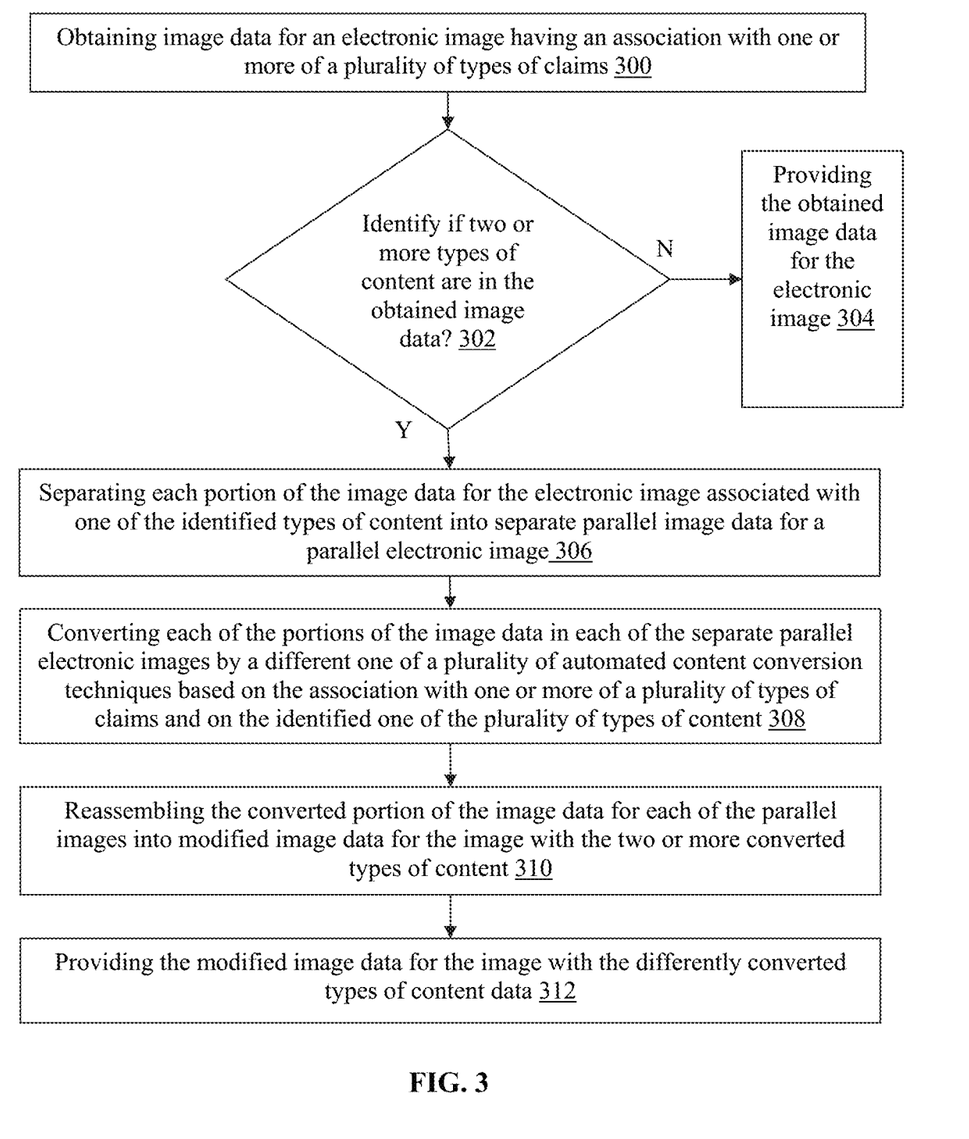
FIG. 3 is a flow chart of an example of a method for managing dynamic format conversion of an electronic image.

In step 302, the image conversion management computing apparatus 12 identifies if two or more types of content are in the image data for the electronic image. In this example, the content detection module 34 is executed by the image conversion management computing apparatus 12 for this identification of different types of content and their particular locations in the image data for the electronic image, although other manners for identifying if two or more types of content are in the image data for the electronic image and/or their location may be used.

If in step 302 the image conversion management computing apparatus 12 does not identify two or more types of content in the image data for the electronic image then the No branch can be taken to step 304. In step 304, the image data for the electronic image can be provided by the image conversion management computing apparatus 12 for further use without different types of conversion or for other operations, such as storage in the current format.

If in step 302 the image conversion management computing apparatus 12 does identify two or more types of content in the image data for the electronic image then the Yes branch can be taken to step 306. In step 306, the image conversion management computing apparatus 12 may separate each portion of the image data for the electronic image associated with one of the identified types of content into separate portions of image data for a parallel electronic image for each of the identified types of content, although the image data for the electronic image can be processed in other manners to convert the different types of identified content. In this particular example, the image data for the electronic non-bitonal image is separated by the image conversion management computing apparatus 12 into first parallel image data for a first parallel electronic image comprising the portion of the image data identified as textual content and into second parallel image data for a second parallel electronic image comprising the portion of the image data identified as non-textual content, although the image data may be separated in other manners, such as into three or more portions of the image data in three or more corresponding parallel images if there are three different types of content identified by way of example.

In step 308, the image conversion management computing apparatus 12 converts each of the portions of the image data in each of the separate parallel electronic images by a different one of a plurality of automated content conversion techniques based on the prior association with one or more of a plurality of types of claims and on the identified one of the plurality of types of content. In this particular example, the first parallel image data for the first parallel electronic image with the identified textual content is converted by the image conversion management computing apparatus 12 based on textual conversion technique, such as one provided by the textual content conversion module 36, although other manners for converting or otherwise compressing the first parallel electronic image may be used. Additionally, in this example second parallel image data for the second parallel electronic image with the identified non-textual content is converted by the image conversion management computing apparatus 12 based on textual conversion technique, such as one provided by the non-textual content conversion module 38, although other manners for converting or otherwise compressing the first image may be used.

Figure 5B:
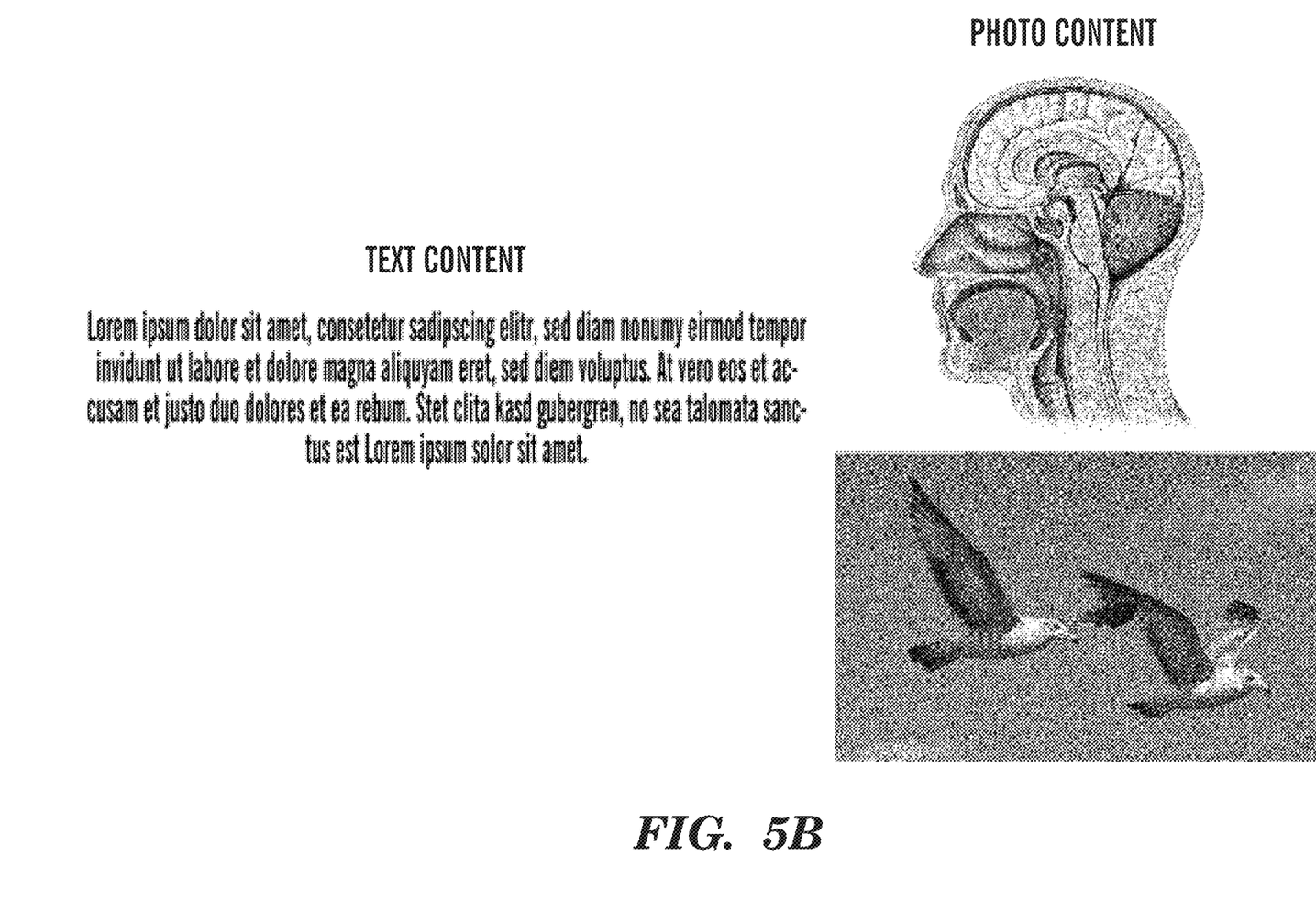
FIG. 5B is a diagram of an example of a dynamically converted bitonal image of the document shown in FIG. 5A.

In step 310, the image conversion management computing apparatus 12 reassembles the converted portion of the image data for each of the parallel electronic images into modified image data for a modified electronic image with the two or more converted types of content, although other manners for reassembling or otherwise merging the separated and converted portions of image data may be used. In this particular example, the first converted parallel image for textual content and second converted parallel image for non-textual content are merged into a reassembled converted bitonal image by the image conversion management computing apparatus 12 based on executing a merger or other reassembly technique provided by the content merger module 40, although again other manners for merging or otherwise combining the images may be used. By way of example only, a diagram of the converted bitonal image or modified image data of the modified image of the example of the document is illustrated in FIG. 5B. In this illustrated example, the utilized compression maintains better fidelity of different portions of the image data based on the identified type of content. If applied to a document for a medical insurance claim, this technology would facilitate processing of this claim with this correspondingly modified image of the document In step 312, the reassembled and converted bitonal image or otherwise modified image data for the electronic image is provided by the image conversion management computing apparatus 12 to one of the image storage devices 16(1)-16(n) for storage, although the converted bitonal image or otherwise modified image data for the electronic image could be provide to other devices for other types of additional processing. By way of example only, the reassembled and converted bitonal image could be provided to assist with electronic processing of an insurance claim retrieved from one of the electronics claims storage devices 18(1)-18(n) by one of the client devices 14(1)-14(n).

An example of another method for managing dynamic format conversion of an electronic non-bitonal image will now be illustrated and described with reference to FIGS. 1-2, 4, and 5A-5B. In step 400, the image conversion management computing apparatus 12 ingests or otherwise obtains image data for an electronic non-bitonal image for dynamic conversion in multiple vectors, such illustrated in FIG. 5A by way of example only, although other types and/or numbers of electronic images may be obtained for this dynamic conversion. Additionally, in this particular example the obtained image data for the electronic image has an association with one or more of a plurality of types of claims. This association may be provided with the image data for the electronic image or may be provided based on where the image data for the electronic image is obtained from, such as from one of the image storage devices 16(1)-16(n) which is designated as storing image data for electronic images associated with one or more of a plurality of types of claims, although other manners for determining this association may be used. By way of example only, the image conversion management computing apparatus 12 could analyze at least a portion of the content in the image data for the electronic image to determine if the content is correlated to stored content associated with one or more of a plurality of types of claims. In these examples, the association of the image data for the electronic image with one or more of a plurality of types of claims influences the type of conversion technique which may be executed by the image conversion management computing apparatus 12 based on the identified type of content, although other factors may affect the type of conversion technique used.

Figure 4:
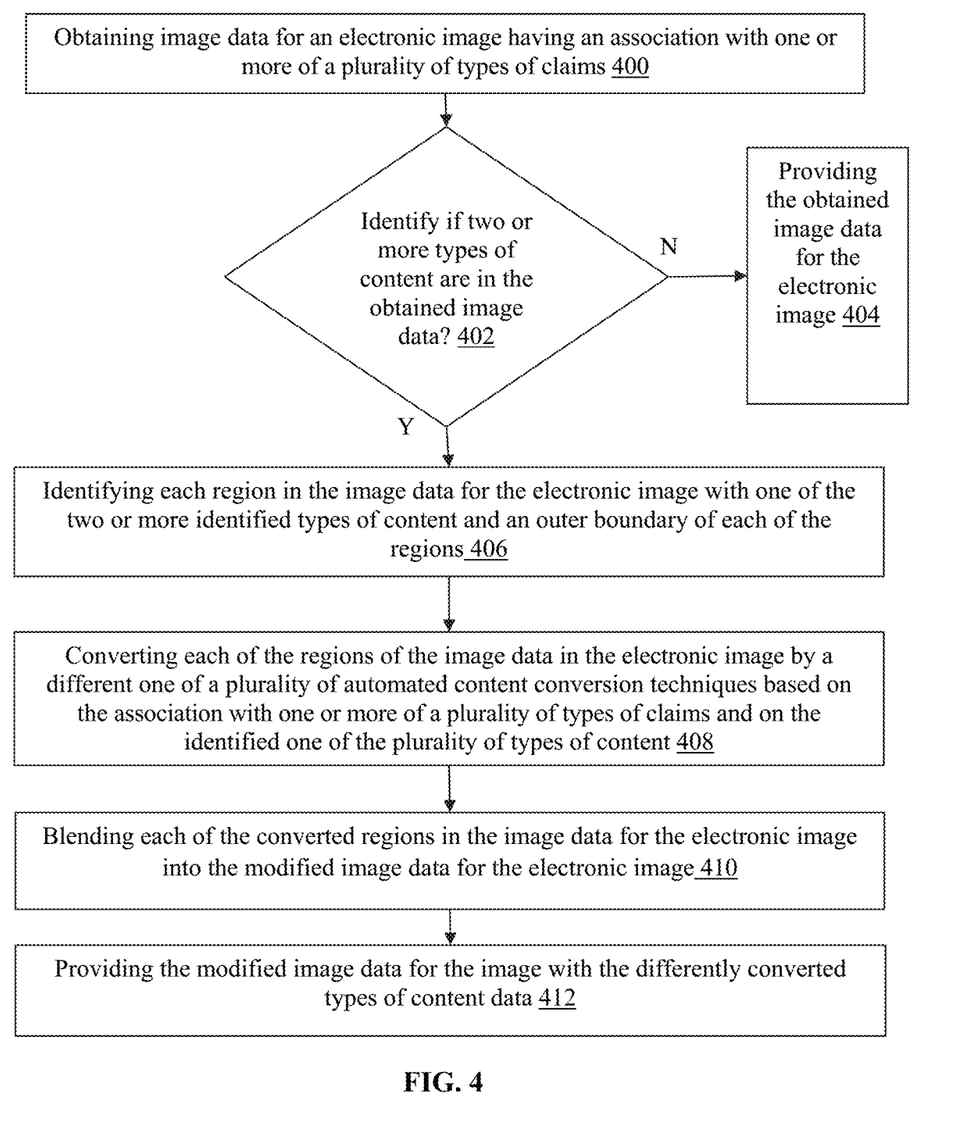
FIG. 4 is a flow chart of an example of another method for managing dynamic format conversion of an electronic image.

In step 402, the image conversion management computing apparatus 12 identifies if two or more types of content are in the image data for the electronic image. In this example, the content detection module 34 is executed by the image conversion management computing apparatus 12 for this identification of different types of content and their particular locations in the image data for the electronic image, although other manners for identifying if two or more types of content are in the image data for the electronic image and/or their location may be used.

If in step 402 the image conversion management computing apparatus 12 does not identify two or more types of content in the image data for the electronic image then the No branch can be taken to step 404. In step 404, the image data for the electronic image can be provided by the image conversion management computing apparatus 12 for further use without different types of conversion or for other operations, such as storage in the current format.

If in step 402 the image conversion management computing apparatus 12 does identify two or more types of content in the image data for the electronic image then the Yes branch can be taken to step 406. In step 406, the image conversion management computing apparatus 12 may identify each region in the image data for the electronic image with one of the two or more identified types of content and an outer boundary of each of the regions. In this example, the content detection module 34 is executed by the image conversion management computing apparatus 12 for the identification of different types of content and their particular locations including the pixels forming an outer boundary of each region in the image data for the electronic image, although other manners for identifying each of the types of content and their location may be used.

In step 408, the image conversion management computing apparatus 12 converts each of the regions of the image data in the electronic image by a different one of a plurality of automated content conversion techniques based on the association with one or more of a plurality of types of claims and on the identified one of the plurality of types of content. In this particular example, converts each of the portions of the image data in each of the separate parallel electronic images by a different one of a plurality of automated content conversion techniques based on the prior association with one or more of a plurality of types of claims and on the identified one of the plurality of types of content. In this particular example, portions of the image data for the electronic image with the identified textual content is converted by the image conversion management computing apparatus 12 based on textual conversion technique, such as one provided by the textual content conversion module 36, although other manners for converting or otherwise compressing the first parallel electronic image may be used. Additionally, in this example other portions of the image data for the electronic image with the identified non-textual content are converted by the image conversion management computing apparatus 12 based on textual conversion technique, such as one provided by the non-textual content conversion module 38, although other manners for converting or otherwise compressing the first image may be used.

In step 410, the image conversion management computing apparatus 12 blends each of the converted regions in the image data for the electronic image into the modified image data for the electronic image. By way of example, the image conversion management computing apparatus 12 may execute programmed instructions for a softening technique or a blurring technique on pixels at an outer boundary between identified regions of the different identified types of converted content, such as one or more stored techniques provided by the image blending module 42, although other techniques for adjusting aspects of the converted image data may be used. By way of example only, a diagram of the converted bitonal image or modified image data of the modified image of the example of the document is again illustrated in FIG. 5B. In this illustrated example, the utilized compression maintains better fidelity of different portions of the image data based on the identified type of content. If applied to a document for a medical insurance claim, this technology would facilitate processing of this claim with this correspondingly modified image of the document.

In step 412, the reassembled and converted bitonal image or otherwise modified image data for the electronic image is provided by the image conversion management computing apparatus 12 to one of the image storage devices 16(1)-16(n) for storage, although the converted bitonal image or otherwise modified image data for the electronic image could be provide to other devices for other types of additional processing. By way of example only, the reassembled and converted bitonal image could be provided to assist with electronic processing of an insurance claim retrieved from one of the electronics claims storage devices 18(1)-18(n) by one of the client devices 14(1)-14(n).

Accordingly, as illustrated by way of the examples herein the claimed technology provides methods, non-transitory computer readable medium, and apparatuses that optimize management of dynamic format conversion of an electronic image. This technology uses content aware algorithms to ensure that different parts of an image, such as a non-bitonal image, are converted using different methods (such as contrast vs edge enhancement vs pixel density by way of example only) to achieve a conversion that retains as much fidelity as possible for non-textual parts of the document, while enhancing textual legibility. With this technology, converted images will contain compressed images that have enhanced photo and text elements when compared to previously available converters and will facilitate processing of any associated claims.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

identifying, by a computing apparatus, with automated image analysis two or more different types of content in image data for an electronic image associated with one or more of a plurality of types of claims;

converting, by the computing apparatus, the image data associated with each of the identified two or more different types of content by a different one of a plurality of automated content conversion techniques based on the association with the one or more types of claims and on the identified one of the plurality of types of content;

generating, by the computing apparatus, modified image data for the electronic image based on the converted image data associated with each of the identified two or more different types of content;

providing, by the computing apparatus, the modified image data for the electronic image with the converted image data for each of the identified two or more different types of content; and identifying, by the computing apparatus, each region in the image data for the electronic image with one of the two or more identified types of content and an outer boundary of each of the regions;

wherein the converting further comprises converting, by the computing apparatus, each of the regions of the image data in the electronic image by a different one of a plurality of automated content conversion techniques based on the association with the one or more types of claims and on the identified one of the plurality of types of content;

wherein the generating the modified image data for the electronic image further comprises blending, by the computing apparatus, each of the converted regions in the image data for the electronic image into the modified image data for the electronic image.

2. The method as set forth in claim 1, further comprising:

separating, by the computing apparatus, each portion of the image data for the electronic image associated with one of the identified types of content into separate parallel image data for a parallel electronic image;

wherein the converting further comprises converting, by the computing apparatus, each of the portions of the image data in each of the separate parallel electronic images by a different one of a plurality of automated content conversion techniques based on the association with the one or more types of claims and on the identified one of the plurality of types of content;

wherein the generating the modified image data for the electronic image further comprises reassembling, by the computing apparatus, the converted portion of the image data in each of the parallel electronic images into the modified image data for the electronic image.

3. The method as set forth in claim 1, comprising:

wherein the blending further comprises executing, by the computing apparatus, at least one of an automated softening technique or an automated blurring technique on image data at the outer boundary of each of the regions.

4. The method as set forth in claim 1, wherein the identifying with automated image analysis two or more different types of content in the image data for the electronic image further comprises:

utilizing, by the computing apparatus, a deep neural network (DNN) trained on identifying different types of content based on different types of claims to identify the two or more different types of content in the image data for the electronic image.

5. The method as set forth in claim 4, wherein the utilizing the deep neural network (DNN) to identify the two or more different types of content in the image data for the electronic image further comprises:

utilizing, by the computing apparatus, the DNN to identify an outer boundary of each region with one of the identified types of content.

6. The method as set forth in claim 1, wherein the different types of content comprise textual content and non-textual content.

7. A non-transitory computer readable medium having stored thereon instructions comprising executable code which when executed by a processor, causes the processor to:

identify with automated image analysis two or more different types of content in image data for an electronic image associated with one or more of a plurality of types of claims;

convert the image data associated with each of the identified two or more different types of content by a different one of a plurality of automated content conversion techniques based on the association with the one or more types of claims and on the identified one of the plurality of types of content;

generate modified image data for the electronic image based on the converted image data associated with each of the identified two or more different types of content;

provide the modified image data for the electronic image with the converted image data for each of the identified two or more different types of content; and identify each region in the image data for the electronic image with one of the two or more identified types of content and an outer boundary of each of the regions;

wherein convert the image data further comprises executable code which when executed by a processor causes the processor to: convert each of the regions of the image data in the electronic image by a different one of a plurality of automated content conversion techniques based on the association with the one or more types of claims and on the identified one of the plurality of types of content;

wherein the generate the modified image data for the electronic image further comprises executable code which when executed by a processor causes the processor to: blend each of the converted regions in the image data for the electronic image into the modified image data for the electronic image.

8. The medium as set forth in claim 7, further comprising executable code which when executed by a processor, causes the processor to:

separate each portion of the image data for the electronic image associated with one of the identified types of content into separate parallel image data for a parallel electronic image;

wherein the convert the image data further comprises executable code which when executed by a processor causes the processor to: convert each of the portions of the image data in each of the separate parallel electronic images by a different one of a plurality of automated content conversion techniques based on the association with the one or more types of claims and on the identified one of the plurality of types of content;

wherein the generate the modified image data for the electronic image further comprises executable code which when executed by a processor causes the processor to: reassemble the converted portion of the image data in each of the parallel electronic images into the modified image data for the electronic image.

9. The medium as set forth in claim 7, wherein the blend each of the converted regions further comprises executable code which when executed by a processor, causes the processor to:
execute at least one of an automated softening technique or an automated blurring technique on image data at the outer boundary of each of the regions.

10. The medium as set forth in claim 7, wherein the identify with automated image analysis two or more different types of content in the image data for the electronic image further comprises executable code which when executed by a processor causes the processor to:
utilize a deep neural network (DNN) trained on identifying different types of content based on different types of claims to identify the two or more different types of content in the image data for the electronic image.

11. The medium as set forth in claim 10, wherein the utilize the deep neural network (DNN) to identify the two or more different types of content in the image data for the electronic image further comprises executable code which when executed by a processor causes the processor to:
utilize the DNN to identify an outer boundary of each region with one of the identified types of content.

12. The medium as set forth in claim 7, wherein the different types of content comprise textual content and non-textual content.

13. A computing apparatus comprising:
a processor; and
a memory coupled to the processor which is configured to be capable of executing programmed instructions stored in the memory to:
identify with automated image analysis two or more different types of content in image data for an electronic image associated with one or more of a plurality of types of claims;
convert the image data associated with each of the identified two or more different types of content by a different one of a plurality of automated content conversion techniques based on the association with the one or more types of claims and on the identified one of the plurality of types of content;
generate modified image data for the electronic image based on the converted image data associated with each of the identified two or more different types of content;
provide the modified image data for the electronic image with the converted image data for each of the identified two or more different types of content; and
identify each region in the image data for the electronic image with one of the two or more identified types of content and an outer boundary of each of the regions;
wherein the convert the image data further comprises at least one additional programmed instruction stored in the memory to: convert each of the regions of the image data in the electronic image by a different one of a plurality of automated content conversion techniques based on the association with the one or more types of claims and on the identified one of the plurality of types of content;
wherein the generate the modified image data for the electronic image further comprises at least one additional programmed instruction stored in the memory to: blend each of the converted regions in the image data for the electronic image into the modified image data for the electronic image.

14. The apparatus as set forth in claim 13, wherein the processor coupled to the memory is further configured to be capable of executing at least one additional programmed instruction stored in the memory to:
separate each portion of the image data for the electronic image associated with one of the identified types of content into separate parallel image data for a parallel electronic image;
wherein the convert the image data further comprises at least one additional programmed instruction stored in the memory to: convert each of the portions of the image data in each of the separate parallel electronic images by a different one of a plurality of automated content conversion techniques based on the association with the one or more types of claims and on the identified one of the plurality of types of content;
wherein the generate the modified image data for the electronic image further comprises at least one additional programmed instruction stored in the memory to: reassemble the converted portion of the image data in each of the parallel electronic images into the modified image data for the electronic image.

15. The apparatus as set forth in claim 13, wherein the blend each of the converted regions further comprises at least one additional programmed instruction stored in the memory to:
execute at least one of an automated softening technique or an automated blurring technique on image data at the outer boundary of each of the regions.

16. The apparatus as set forth in claim 13, wherein the identify with automated image analysis two or more different types of content in the image data for the electronic image further comprises at least one additional programmed instruction stored in the memory to:
utilize a deep neural network (DNN) trained on identifying different types of content based on different types of claims to identify the two or more different types of content in the image data for the electronic image.

17. The apparatus as set forth in claim 16, wherein the utilize the deep neural network (DNN) to identify the two or more different types of content in the image data for the electronic image further comprises at least one additional programmed instruction stored in the memory to:
utilize the DNN to identify an outer boundary of each region with one of the identified types of content.

18. The apparatus as set forth in claim 13, wherein the different types of content comprise textual content and non-textual content.

* * * * *